United States Patent
Boucher et al.

(10) Patent No.: US 6,859,483 B1
(45) Date of Patent: Feb. 22, 2005

(54) INDUCED ABSORPTION FILTER (IAF)

(75) Inventors: A. Neil Boucher, Whetstone (GB); Dennis G. Fischer, Auburn, CA (US)

(73) Assignee: Coherent Optics Europe Limited, Whetstone (GB)

(*) Notice: Subject to any disclaimer, the term of this patent is extended or adjusted under 35 U.S.C. 154(b) by 0 days.

(21) Appl. No.: 10/031,209

(22) PCT Filed: Jul. 10, 2000

(86) PCT No.: PCT/GB00/02549

§ 371 (c)(1),
(2), (4) Date: May 13, 2002

(87) PCT Pub. No.: WO01/04670

PCT Pub. Date: Jan. 18, 2001

(30) Foreign Application Priority Data

Jul. 13, 1999 (GB) .............................................. 9916339

(51) Int. Cl.⁷ ................................................ H01S 3/08
(52) U.S. Cl. .......................................... 372/92; 372/99
(58) Field of Search ..................................... 372/92, 99

(56) References Cited

U.S. PATENT DOCUMENTS

| | | | | |
|---|---|---|---|---|
| 5,341,238 A | * | 8/1994 | Trost et al. .................. | 359/359 |
| 5,784,507 A | * | 7/1998 | Holm-Kennedy et al. .... | 385/31 |
| 5,814,416 A | * | 9/1998 | Dodabalapur et al. ...... | 313/504 |
| 5,874,803 A | * | 2/1999 | Garbuzov et al. ........... | 313/506 |
| 6,154,480 A | * | 11/2000 | Magnusson et al. ........... | 372/96 |
| 6,185,241 B1 | * | 2/2001 | Sun .............................. | 372/96 |

* cited by examiner

*Primary Examiner*—Don Wong
*Assistant Examiner*—Cornelius H Jackson
(74) *Attorney, Agent, or Firm*—Stallman & Pollock LLP (57) ABSTRACT

An optical filter uses a multi-layer, stack of alternating dielectric layers (16, 18) of different refractive indices, a dielectric spacer layer (20) and metal layer (21), to achieve a narrow overall absorption bandwidth, with high reflectance upon either side. A tunable (optical) filter variant uses a dielectric stack and spacer coating of spatially-varying thickness, that is a coating of depth varying, say linearly and/or circularly, according to position across an absorbent layer or substrate, whereby, at different positions on the surface, a different wavelength is absorbed. A tunable laser (35) uses opposed tunable filters (26, 28) bounding a lasing medium (38), such as $CO_2$ gas, for selective variable stimulated emission of radiation (39).

11 Claims, 7 Drawing Sheets

INDUCED ABSORPTION FILTER (IAF)

This application is a 371 of PCT/GB00/02549 filed Jul. 10, 2000.

This invention relates to optical interference filters, their adaptation to tunable filters and their deployment in lasers—in particular, but not exclusively, tunable lasers, or those which 'lase' at several (discrete) wavelengths.

An aspect of the invention is concerned with a selective, narrow-band (width), absorption filter.

Another aspect of the invention is concerned with a monolithic, continuously variable (wavelength) filter.

Yet another aspect of the invention is concerned with a laser deploying the subject filters, bounding an excitation medium.

A still further aspect of the invention is concerned with a tunable, or 'mulple-line', laser—configured to engender dedicated excitation, at a selectable one or more particular wavelengths.

The various aspects are generally applicable to a range of wavelengths, but on occasion particular emphasis is given to certain regions of the spectrum.

Terminology

Reference is made—in relation to optical properties of materials, and in particular successive layers of material, at certain wavelengths—to the terms refractive index, absorption or extinction (coefficient) and attendant qualifiers (relatively) high and low.

Generally, refractive index (RI) determines the proportion of light reflected at a boundary or interface with another material (medium), of different refractive index.

Thus, for example, at an interface between air (RI unity) and, say, germanium (RI of 4) some 36% of incident light is reflected.

In the present case, where relatively high and low RI materials are juxtaposed, the key factor is the RI differential.

Typically, a high refractive index material would be selected from the RI range 2 to 4, whereas a low refractive index material would be in the range 1.3 to 2.4.

Maximising RI differential allows optical coatings with fewer layers, subject to considerations of intrinsic stresses, transparency and mutual compatibility.

A high reflectivity can be considered as generally better than some 90%.

The other key property of extinction coefficient, or absorptance, concerns how much of incident light traversing an interface is absorbed, per unit length or thickness.

At an atomic level, the absorption mechanism involves an interaction between photons and atoms capable of being excited thereby—which depletes photon energy until exhausted.

Metals typically exhibit high extinction coefficients. Thus for gold, the value is 2, in the visible spectrum region, and 55 in the infra-red region, of some 10.6 microns.

If the extinction coefficient is low, a layer needs to be sufficiently thick to absorb all the light channelled into it.

Thus, absorption, by or through a layer is determined by a combination of extinction coefficient and layer thickness factors.

Generally, the present case is concerned with extinction coefficients in the range 2 to 60, with a typical layer thickness of some 100 nm.

Interference Filters

Many types of interference filter are known—including long wave-pass, short wave-pass, and band-pass filters, dielectric enhanced metallic reflectors, induced transmission filters and broad-band absorption filters.

An instance is a narrow-band, absorption filter. This absorbs, (or attenuates) strongly at a discrete wavelength, whilst being non-dissipative (eg highly reflective) in spectral regions both immediately above and below this wavelength.

Many such filter types are described in, for instance, 'Thin-Film Optical Filters', by H A Macleod, (2nd edition, published by Adam Hilger).

Broad-band absorption filter types are described in EP 0921 419 A1 'Revetment absorbeur de lumiere a haut pouvoir absorbant', of inventors Quesnel and Chaton.

Prefacing Statement of Invention

The present invention addresses a new class of thin-film, interference filter construction, which effects narrow-band absorption.

Versions of such a filter are useful in 'tuning' laser excitation and radiation, such as in a carbon dioxide ($CO_2$) lasing medium.

Background Art—Dielectric Filters

A simple (dielectric) band-pass filter consists of two dielectric 'stacks'—acting as (reflector) mirrors—disposed at opposite sides of a dielectric 'spacer' layer.

Resonance is set up, or engendered, (in the spacer layer) between such opposed (dielectric stack) reflectors.

This resonance causes, or allows, transmission of light, at a particular wavelength—in practice equal to half the optical thickness of the spacer layer.

A high level of reflectance (ie non-transmission) is achieved at both sides of a (transmission) pass-band.

Fabry-Perot Filter

One well-known type of (dielectric, interference) filter is the so-called Fabry-Perot filter.

The principles of the Fabry-Perot filter are described, for example, in the references:

'Thin Film Optical Filters', by H. A. Macleod, 2nd edition, published by Adam Hilger, pp238 to 257; and The Optical Society of America's 'Handbook of Optics', published by McGraw Hill, pp8–76 to 8–80.

Fabry-Perot filters are based upon an interferometer of the same name, employing two identical reflecting surfaces, spaced apart by a set distance.

A Fabry-Perot filter contains the same essential components—namely two reflectors and a spacer.

The reflectors can either be metallic layers, or dielectric stacks.

Essentially, such a dielectric (reflector) stack is a (sequential) multi-layer, or tiered, structure—of alternating layers of differing refractive indices.

This stack acts like a partially or highly reflective mirror and has essentially no absorbing component.

It is important that the intervening spacer layer is a non-absorbing material.

Generally, a Fabry-Perot filter has three basic components, positioned in a particular relative disposition, or sequence, as follows:

a 'partially or highly reflective' mirror, a non-absorbing, dielectric 'spacer' layer, and, a second, 'partially or highly reflective', mirror.

Light is typically incident upon a first mirror in this sequence.

Both partially or highly reflective mirrors typically have a near-unity reflectance factor (for certain reflected wavelengths).

In the particular case of a 'thin-film' Fabry-Perot filter, the two mirrors each commonly comprise (sequentially-stacked) tiered dielectric layers—of alternating (relatively) low and high refractive indices.

Here, again the reflectance factor of each thin-film mirror stack is close to unity, for certain wavelengths.

A Fabry-Perot filter has a resonance at a wavelength equal to one half of the optical thickness of the spacer layer.

Thus the thickness of the spacer layer is typically a 'half-wave' optical thickness.

In a thin-film Fabry-Perot filter, with all-dielectric layers, a very narrow wavelength band—centered at the resonant wavelength—is transmitted through the filter.

Incident light, at broad wavelength regions, on both sides of this narrow wavelength band, is highly reflected (again, a near-unity reflectance factor).

Although not generally accepted thin-film filter terminology, a thin-film, Fabry-Perot filter could be categorised as an Induced Transmission Filter (ITF).

STATEMENT OF INVENTION

Induced Absorption Filter (IAF)

In certain respects, an Induced Absorption Filter (IAF), according to one aspect of the present invention, represents both a development of—and significant departure from—a Fabry-Perot filter, or ITF.

More specifically, in an IAF according to the invention, a second dielectric mirror stack of the ITF configuration is replaced by a highly reflective, opaque, metal layer.

The high extinction coefficient of this second mirror engenders narrowband absorption rather than narrow-band transmission—thus representing a significant distinction from, and differentiation over, an ITF.

Retention of a spacer layer, preserves the three component configuration of a Fabry-Perot Filter, or ITF—and therefore its resonance.

However, a significant distinction over an ITF arises, since:

- a narrow wavelength band, centered at the resonant wavelength, is essentially not reflected (near-zero reflectance factor), and
- the second mirror is opaque.

Thus, this narrow wavelength band is highly absorbed (by a factor of near-unity), in an IAF according to the invention.

Essentially, a filter according to the invention induces narrow-band absorption—hence the designation Induced Absorption Filter (IAF)—whilst highly reflecting (broad) wavelength bands, both above and below the absorbed wavelength band.

IAF General Case Embodiments

Generally, a thin-film IAF, according to the invention, is typically deposited upon a substrate, as the following layer sequence:

- a metal mirror (opaque metallic thin film),
- a dielectric 'spacer' layer, and
- a dielectric mirror stack.

Light is incident upon the dielectric mirror stack.

The metal layer thickness is not critical, provided it exceeds a threshold value, determined by its extinction coefficient.

Alternatively, a highly reflective metal substrate could replace the metal mirror. The substrate essentially provides mechanical support for a (fragile) thin film structure.

In the case of a Fabry Perot filter, a mounting substrate is transparent at the transmitted wavelength. However, for an IAF filter according to the invention—with an intervening metal layer—no light reaches the (mounting) substrate, so transmittance or absorbence is not an issue.

For laser filter applications, the resonant wavelength of the IAF is typically the laser wavelength to be suppressed.

In some cases, there may be a plurality of laser wavelengths to be suppressed.

An IAF according to the invention can accomplish this, based upon the following general rules:

Rule 1

If the dielectric spacer layer is, or comprises, a low refractive index material;

where the dielectric mirror stack comprises:

- the same (or similar) low refractive index material; and
- a (relatively) high refractive index material;

the primary resonant wavelength occurs when the spacer layer is equal to even integer multiples of quarter-waves (optical thickness), including zero (absentee layer).

The corresponding primary resonant wavelength equals the optical thickness of the quarter-wave—independently of the multiple of the selected quarter-wave thickness.

The overall stacking configuration can be described symbolically, as:

$$\text{Substrate}/MnL(HL)^xH/\text{ambient}$$

where:

M is a metal mirror thin film;

'n'=0,2,4,6, etc . . . is an even integer multiple of the quarter wave optical thickness of the spacer layer;

H and L represent quarter wave optical thicknesses, respectively of high and low refractive index layers; and 'x' is a number of pairs of H and L layers required to produce a high reflectance mirror.

Rule 2

If the dielectric spacer layer is, or comprises, a high refractive index material;

where the dielectric mirror stack comprises:

- the same (or similar) high refractive index material; and
- a low refractive index material;

the primary resonant wavelength occurs when the spacer layer is equal to odd integer multiples of quarter-waves (optical thickness), including zero.

The corresponding primary resonant wavelength equals the optical thickness of the quarter-wave—independently of the multiple of the selected quarter-wave optical thickness.

The overall stacking configuration can be described symbolically, as;

$$\text{Substrate}/MnH(LH)^x/\text{ambient}$$

n=0,1,3,5,7, . . .

Rules 3

For both cases, whether the spacer layer is of either high or low refractive index, as the integer multiple of the quarter wave optical thickness is increased, the secondary resonant wavelengths move closer to the primary resonant wavelength.

The secondary resonant wavelengths are present, regardless of the integer multiple—and also occur for real number multiples in-between the prescribed integer multiples.

The required spacer layer thickness for the desired spacing of the resonant wavelengths can be directly calculated, based upon formulae for Fabry-Perot filters from standard thin-film texts.

Illustrated Example of Fabry-Perot Filter

Figure 1:
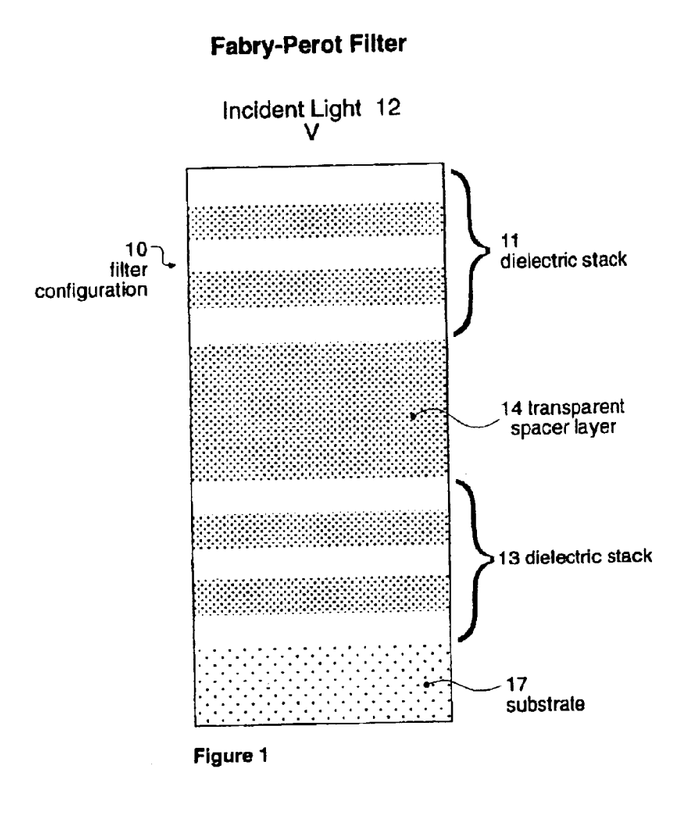
FIG. 1 is a diagram of a Fabry-Perot filter that can be used in accordance with one embodiment of the present invention.

A typical (all) dielectric Fabry-Perot filter construction is depicted in FIG. 1 of the drawings.

A transparent spacer layer 14 is enclosed between two reflecting dielectric stacks 11, 13—each a multi-layered tier of alternating refractive index materials.

Incident light radiation 12 is transmitted through this configuration 10—at wavelengths proportional to the thickness of the spacer layer 14.

Substrate 17, acts as a mechanical support for the thin film structure, and is transparent to transmitted light.

Figure 2:
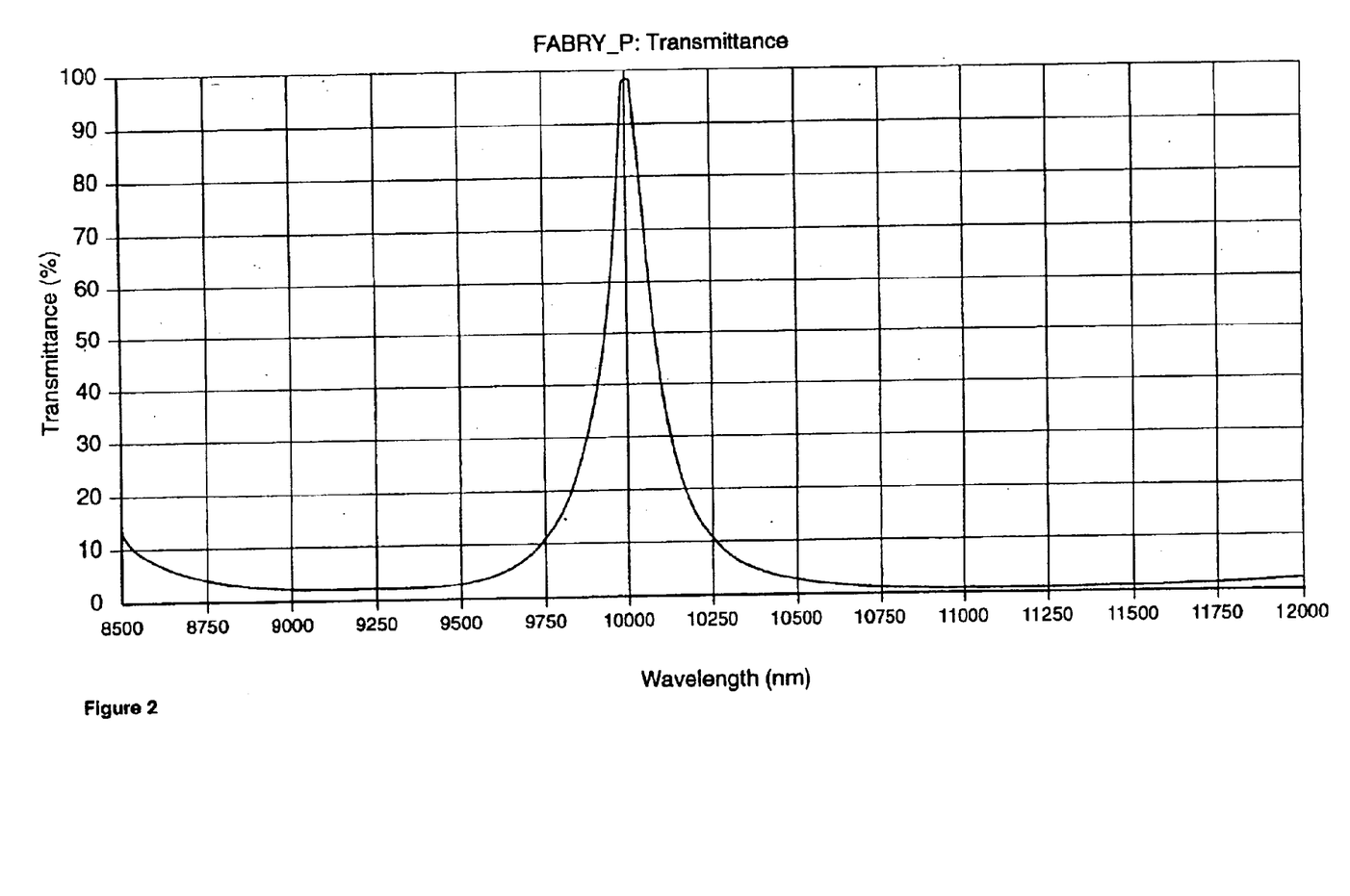
FIG. 2 is a plot showing the transmittance of a Fabry-Perot filter with respect to wavelength.

Typical overall filter performance is represented graphically in FIG. 2.

Filter aspects of the present invention are concerned with variants of such a stacked array of multiple dielectric layers in juxtaposition.

Statement of Invention

According to one aspect of the invention, an optical filter comprises a dielectric stack of alternating (relatively) high and low refractive index layers, a dielectric spacer layer, in juxtaposition with an opaque, reflective metallic layer or substrate, the filter having a resonant wavelength at which wavelength incident radiation is channelled into, and absorbed by, the metallic layer or substrate.

In other configurations, multiple dielectric stacks and spacers can be used according to conventional bandpass filter design techniques.

The common feature is that the lowermost reflector is metallic in nature, with a high reflectivily and extinction coefficient in the spectral region of operation.

These constructions result in a filter of high average reflectivity (say $\geq 99\%$) across a broad operating band, but which is also highly absorbing in a narrow wavelength band within the broader region. The width of the absorption feature is typically as low as 1% in bandwidth, with absorption maxima typically in the 80–99% range, Such a construction represents an essentially new type of thin film interference filter, one for which the term 'Induced Absorption Filter' (IAF) has been coined.

In characterising, or differentiating construction of an Induced Absorption Filter according to the invention, over known filter art, one of the dielectric reflector stacks in a conventional (Fabry-Perot type) filter is replaced with a metallic reflector element.

A particular spectral region of operation is from 8 to 12 $\mu m$; although by suitable choice of materials the filter can be optimised to operate in any spectral region.

Illustrated Example of Induced Absorption Filter (IAF)

Figure 3:
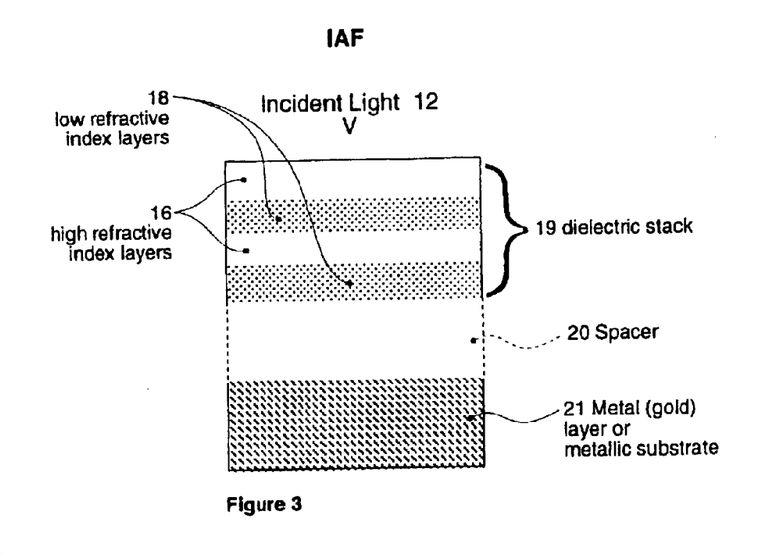
FIG. 3 is a diagram of an Induced Absorption Filter that can be used in accordance with one embodiment of the present invention.

More specifically, referring to FIG. 3 of the drawings, a dielectric stack 19, of alternating layers 16, 18 of different refractive index H, L, is disposed upon a transparent dielectric 'spacer' layer 20.

These in turn are disposed upon a metal layer 21, such as gold, with a high reflectivity and extinction coefficient.

The metal layer 21 could be a coating upon a substrate (not shown), or alternatively could be substituted by a metallic substrate (not shown).

The structure appears to incident radiation to be a band-pass filter, in that there are two reflectors, one on each side of a spacer layer.

Due to resonance within the spacer layer, one or more particular wavelengths try to pass though the structure, but these become absorbed within the metallic layer—due to the high extinction coefficient of the metal.

All other incident radiation is reflected with high efficiency. For at these wavelengths the combination of a metal layer and dielectric stack acts as an enhanced reflector.

As stated above a metal substrate could be used instead of a deposited metallic layer. In this case the device could be actively cooled if used in high power applications.

The overall Induced Absorption Filter (IAF) construction, according to one aspect of the invention, is straightforward—and in physical thickness amounts to less than half that of an equivalent Fabry-Perot band-pass filter.

Such an Induced Absorption Filter (IAF) can be fabricated by a graded thickness coating technology (described later), in order to achieve a tunable filter performance.

Firstly though, the application of Induced Absorption Filter technology to a laser, according to another aspect of the invention, will be described.

Laser Application of Induced Absorption Filter (IAF)

Figure 4:
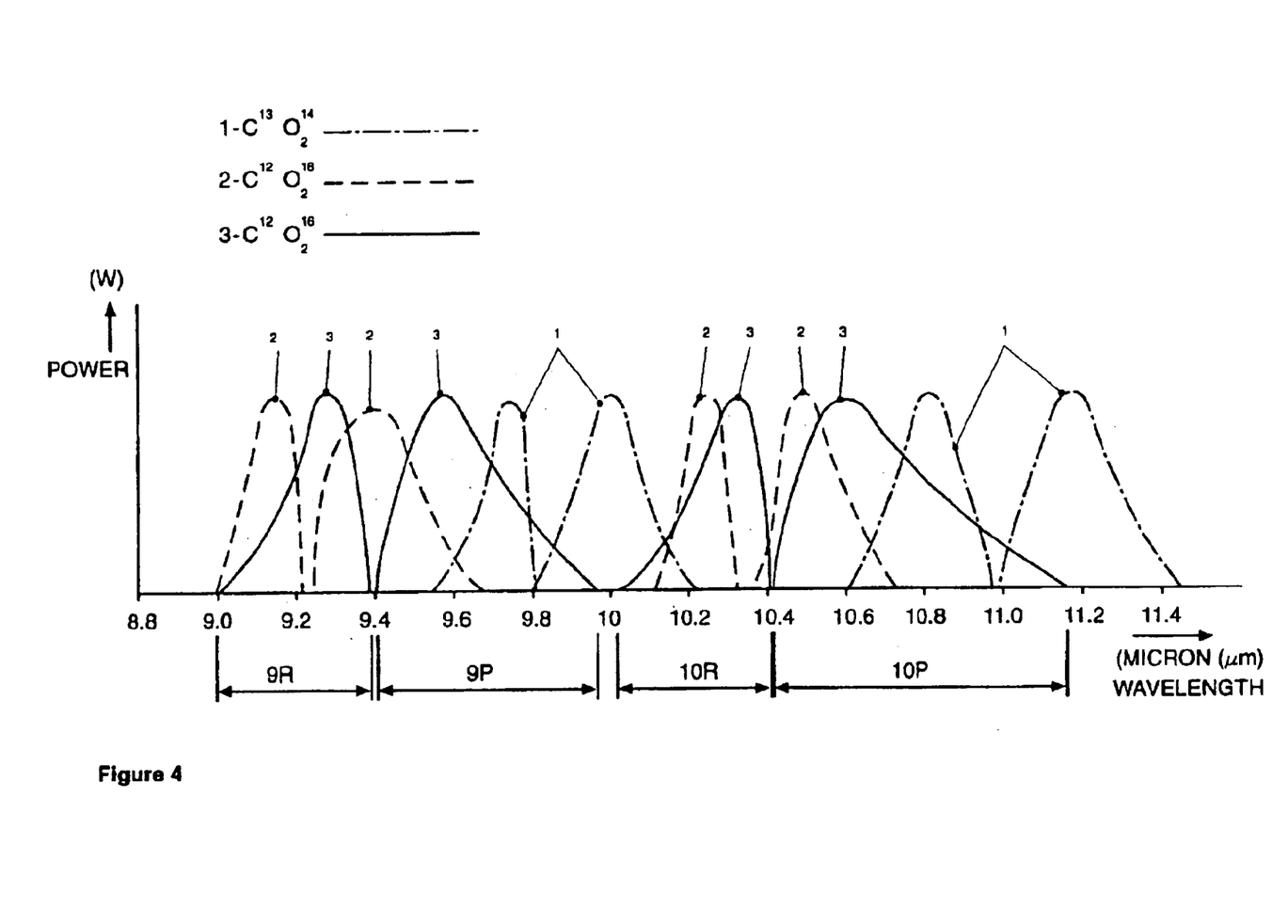
FIG. 4 is a plot showing the performance of a $CO_2$ laser operating at multiple wavelengths.

In some circumstances, the ability of lasers, such as a carbon dioxide ($CO_2$) medium laser, to operate at more than one wavelength—with an overall performance as depicted graphically in FIG. 4—can be detrimental.

Thus, in most applications, such as cutting, welding, etching and marking, it is desirable for the properties of the beam to remain constant throughout the operation.

It is not therefore beneficial if the laser 'drifts'—that is skips from one operating wavelength to another, or if it operates at several wavelengths simultaneously.

Most lasers consist of a tube of lasing medium (such as $CO_2$), contained between two (reflecting) mirrors.

Radiation travelling backwards and forwards between the two mirrors results in light amplification, by stimulated emission of radiation.

Supplementary Statement of Invention—Laser

According to another aspect of the invention a laser resonator is terminated by first and second mirrors, bounding an intervening lasing medium, which, upon being energised, can provide (optical) gain, at first and second wavelengths, at least one of the mirrors having sufficient reflectivity at the first wavelength, that laser radiation is generated by the resonator, upon excitation of the gain medium, whilst being sufficiently absorptive, at the second wavelength, that laser radiation is not generated by the resonator, upon the same excitation.

The laser will only operate at wavelengths at which the mirrors are highly reflecting (ie reflectively efficient).

If it is desired to constrain the operating wavelength to, for instance 10.6 $\mu m$, it is possible, according to another aspect of the invention, to replace the mirrors with Induced Absorption Filters according to one aspect of the invention.

The Induced Absorption Filters prevent, inhibit, or suppress amplification of radiation at either side of a target wavelength.

Figure 7:
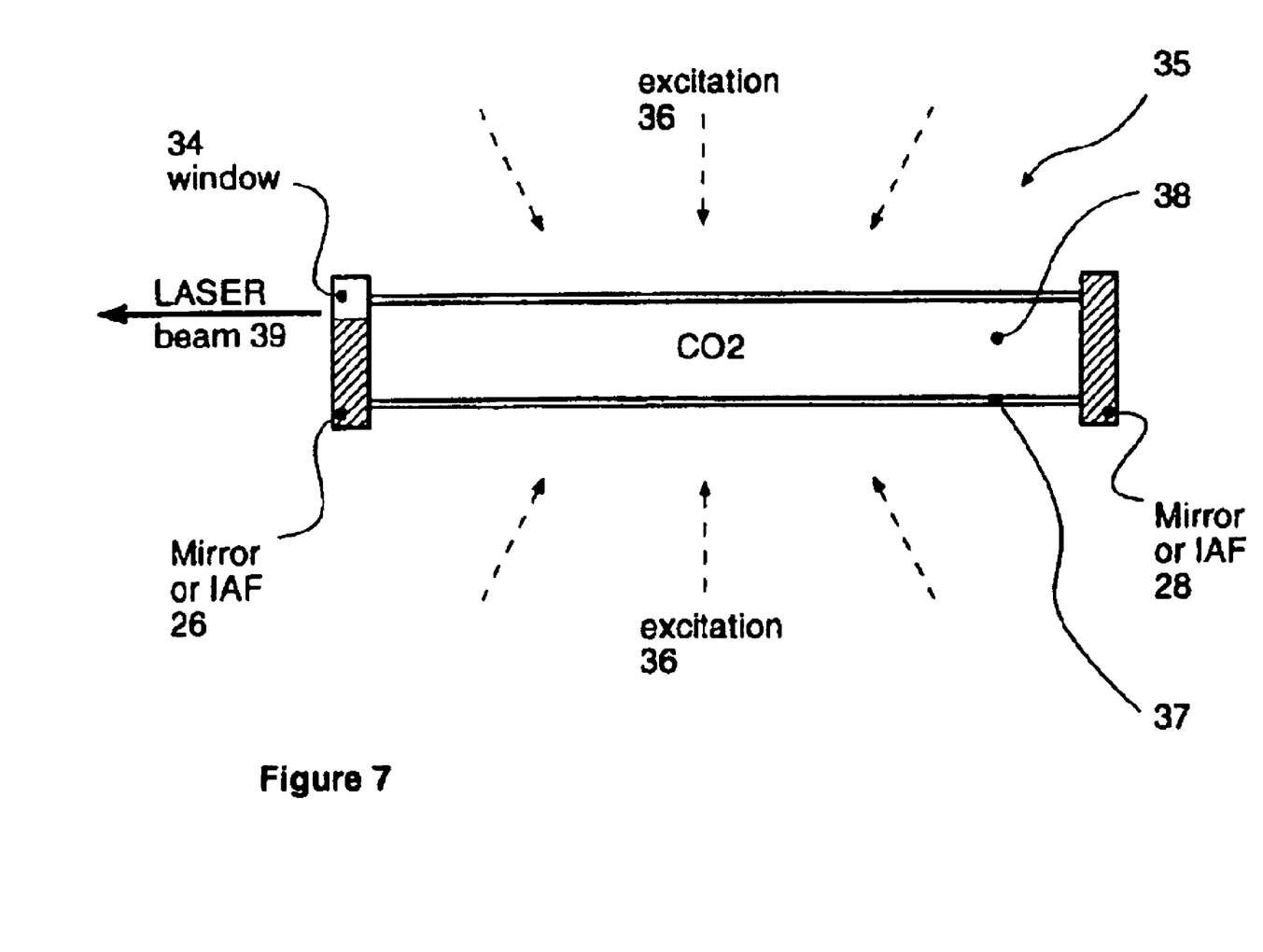
FIG. 7 is a diagram showing companion Induced Absorption Filters at opposing ends of a $CO_2$ laser tube in accordance with one embodiment of the present invention.

Thus, in this instance, a filter 26 would be designed to absorb at, for instance, 10.5 μm, at one end of a laser tube 37, and a companion filter 28 at 10.7 μm, at the other—as depicted in FIG. 7.

External excitation 36, applied to a lasing medium, in this instance $CO_2$ gas 38, confined within the tube, promotes a stimulated emission of radiation, or lasing, resonance.

Such radiation is allowed to exit at one end of the confinement tube 37, through a window 34 in the filter mirror 26.

Figure 8:
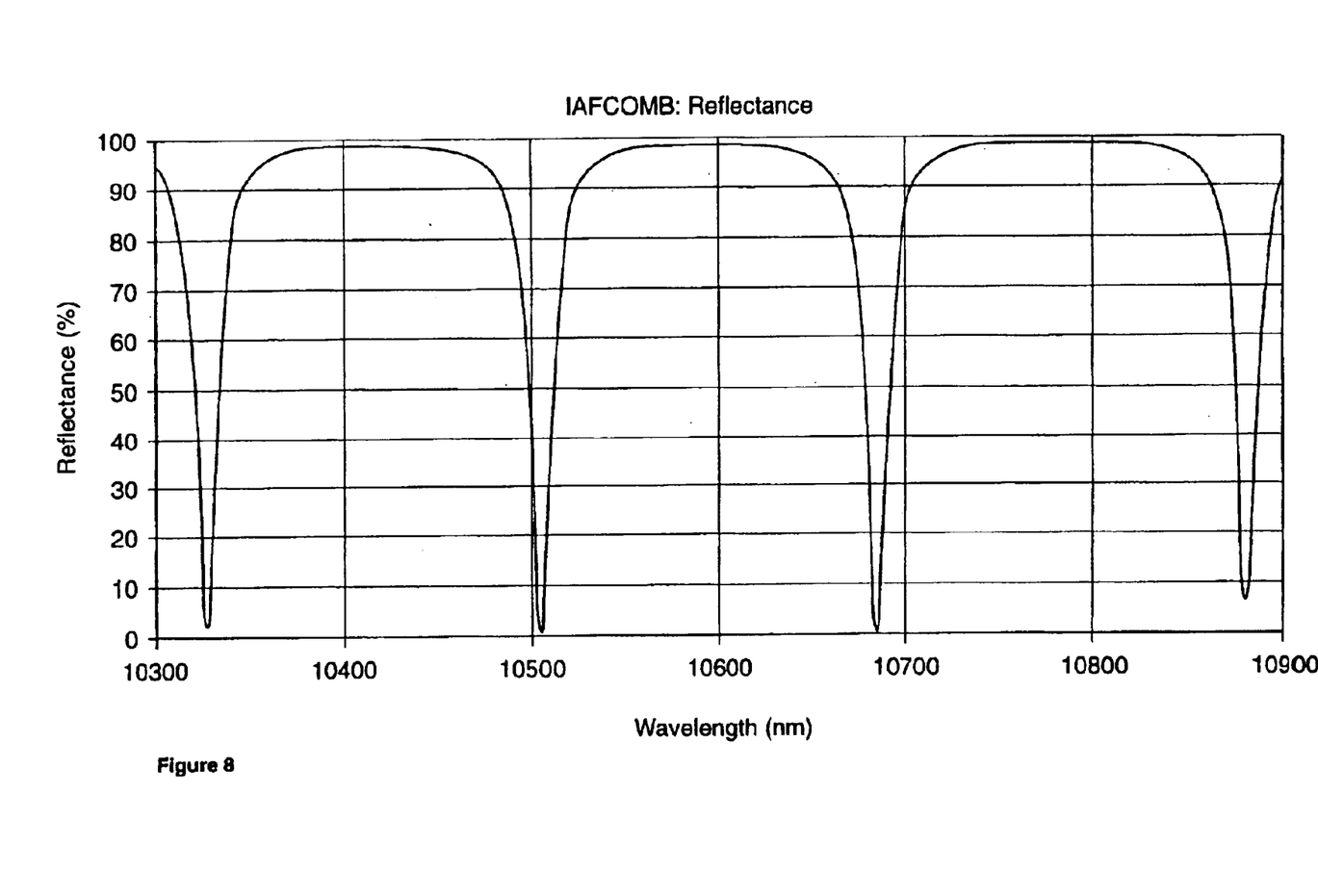
FIG. 8 is a plot of the spectral performance of an Induced Absorption Comb Filter.

Alternatively, it it is desired to use only one mirror, in order to constrain operation of the laser to one wavelength, an induced absorption 'comb' filter could be used—with an overall performance characteristic as depicted graphically in FIG. 8.

Laser Tuning—for Cutting/Machining, or Welding

Carbon dioxide ($CO_2$) lasers are often used to cut, machine or weld common fabrication materials, such as metals, wood and plastics.

Many materials, including most plastics, have a series of discrete absorption bands in the infrared.

By adoption of IAF technology of the present invention, a laser could be 'tuned' to operate at a wavelength corresponding to that of an absorption band of the material being cut.

Thus, rather than much of the energy being transmitted through the plastic, it would mostly be absorbed and so contribute to an energy transfer to the material.

The (cutting, machining or welding) operation would then become more efficient.

Thus a tuned laser would be able to cut or melt the material much more quickly.

Alternatively, a smaller, less expensive, laser than that of a conventional laser employed hitherto, could be used for the task.

A simple IAF filter device could be used actively to tune carbon dioxide lasers.

Laser Marking

Lasers are often used to apply identification marks, or decorative pattern, for materials such as plastics, woods or metals.

Improved edge definition—and therefore, a sharper image—is obtained with monochromatic laser radiation, achievable with an IAF tuned laser according to the present invention.

3D Filter Coating

The Applicants have developed a thin film, three-dimensional (3D) variable coating technology—the subject of their pending UK Patent Application 9722295.4, and corresponding U.S. patent application Ser. No. 08/891,750 and U.S. CIP application Ser. No. 09/233903.

This enables controlled (coating) thickness, or depth, grading of optical thin films, in relation to spatial position, upon a substrate.

In an Induced Absorption Filter according to one aspect of the invention, the wavelength at which radiation is absorbed is dependent only upon the thickness of the dielectric spacer layer.

Taken in conjunction with the Applicants' aforementioned variable coating thickness technique, a variable wavelength absorption filter is achievable.

Supplementary Statement of Invention

Variable Filter

According to yet another aspect of the invention, dielectric layers/stack and/or the spacer are graded (or progressively varied) say, circularly and/or linearly, in thickness, over the surface of a filter, whereby, at different positions on the surface, a different wavelength is absorbed.

Thus, by rotating, or translating, circular or linear variable wavelength induced absorbing filters relative to incident light, beam tuning is achieved.

With a filter position/orientation control mechanism, such variable coating filters could be operated co-operatively in tandem, in order to constrain light amplification at any wavelength at which a laser is capable of operating.

Known Art Relating to the Use of Diffraction Gratings in the Tuning of Laser Radiation In effect, the filters form an (relatively inexpensive) alternative to the diffraction grating (and associated mechanisms), commonly used to perform a tuning function, as exemplified by, say, the references:

'An independently controllable multi-line laser resonator and its use in multi-frequency injection locking', by R. L. Sheffield, S. Nazemi and A. Javan, Advanced Physics Letters 29, pp 588 to 590; and 'A compact, simple stepping motor controlled laser grating mount', by T. W. Carmen, P. E. Dyer and P. Monk, J. Phys E. 13).

Whilst carbon dioxide lasers have been referred to in the illustrative example above, the tunable finer technique according to the invention could be applied to other areas of the (optical) spectrum, such as the visible, near, or medium wave infrared.

Specific Embodiments

There now follows a description of some particular embodiments of the invention, by way of example only, with reference, on occasion, to the accompanying diagrammatic and schematic drawings.

A dielectric stack filter coating utilises sequentially-tiered, paired layers 16, 18 of (relatively) high H (or medium M) and low L refractive index materials, their optical thickness being related to the intended operating wavelength.

Such 'index-pairs' (H-L) could consist of zinc sulphide or selenide, in combination with either thorium fluoride, or germanium.

The layers are deposited alternately.

Beneath the dielectric stack is a dielectric spacer layer, typically but not necessarily comprising one of the two materials used within the stack.

The quarter-wave optical thickness of this layer is close to, but not necessarlly exactly equal to, a multiple (see 'Rules') of the wavelength at which absorption is desired.

In the examples below, the material pair used is:

zinc sulphide—of quarter-wave optical thickness 'H'; and thorium fluoride—of quarter-wave optical thickness 'L'.

As with band-pass filters, there is an almost unlimited variety at constructions that could be used.

The design examples shown below are relatively straightforward, and use gold (Au) as a metal M layer.

EXAMPLE 1

Substrate/$MH(LH)^4$/ambient where H and L equal one quarter-wave optical thicknesses, of relatively high and low refractive index materials, respectively.

EXAMPLE 2

Substrate/$MHHH(LH)^4$/ambient where H and L equal one quarter-wave optical thicknesses, of relatively high and low refractive index materials, respectively.

Figure 5:
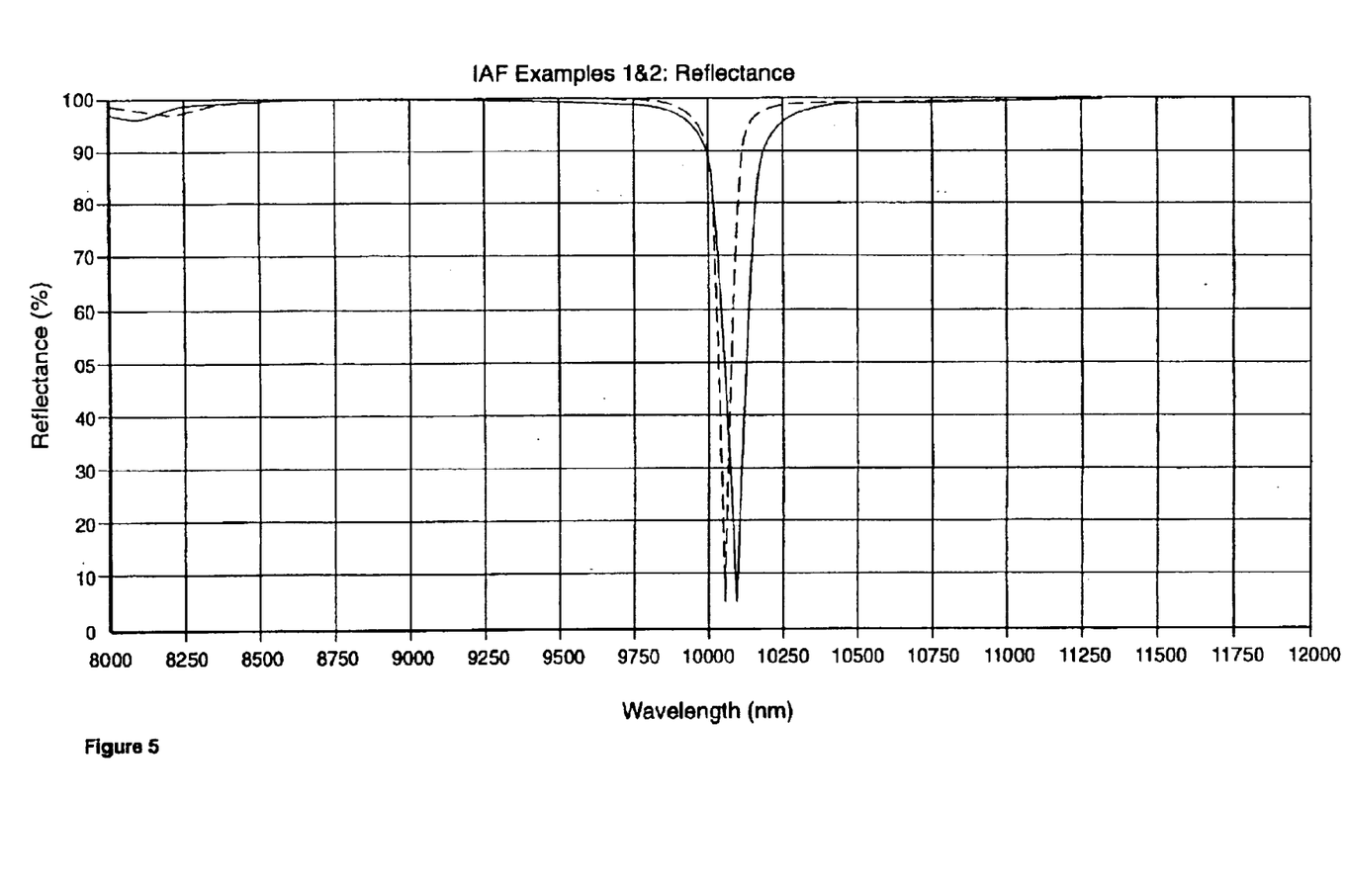
FIG. 5 is a plot of a calculated spectral performance of an Induced Absorption Filter.

Calculated spectral performances of Examples 1 and 2 are depicted in FIG. 5.

Figure 6:
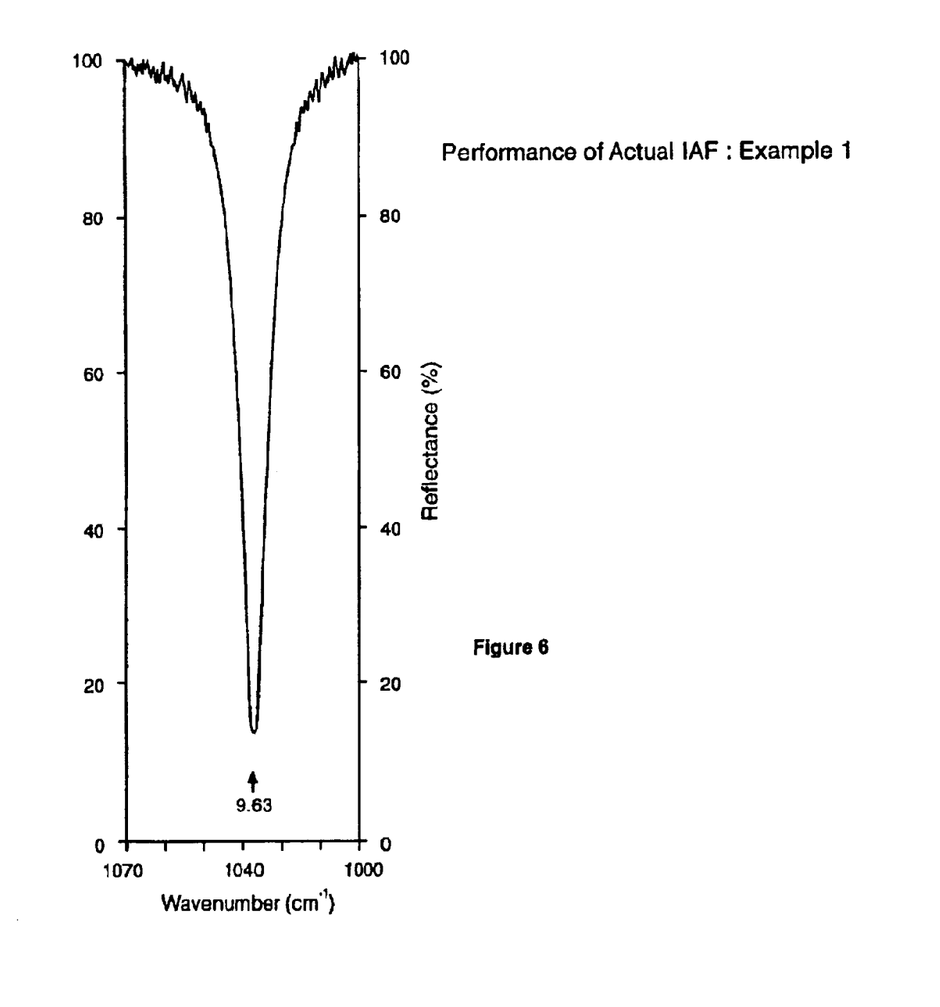
FIG. 6 is a plot of the actual spectral performance of an Induced Absorption Filter.

Actual performance of Example 1 is shown in FIG. 6.

Those skilled in the art will recognise that additional dielectric spacers (not shown) could be incorporated, in order to steepen the absorption edge (or sharpen the transition between absorption and reflection)—and so 'square off' the performance of the filters.

Yet another aspect of the invention provides an Induced Absorption Comb Filter, of configuration:

EXAMPLE 3

Substrate/$M(HL)^2xH(LH)^2$/ambient where H and L equal one quarter-wave optical thickness, of relatively high and low refractive index materials, respectively.

and x=lies generally in the range of about 4 through 1000; for example x=100.

The performance of this filter (where x=100) is depicted in FIG. 8.

Component List 10 filter configuration
11 dielectric stack (Fabry-Perot filter)
12 incident light
13 dielectric stack (Fabry-Perot filter)
14 dielectric spacer (Fabry-Perot filter)
16 high (H) refractive index material
17 substrate (Fabry-Perot filter)
18 low (L) refractive index material
19 dielectric stack (IAF)
20 dielectric (transparent) spacer layer (IAF)
21 metal layer (IAF)
26 filter/mirror
28 filter/mirror
34 window
35 tunable laser
36 excitation
37 laser confinement tube
38 lasing medium (eg $CO_2$ gas)
39 LASER beam

What is claimed is:

1. An optical filter comprising:
   a metal layer;
   a dielectric spacer layer deposited on said metal layer; and
   a dielectric stack of alternating relatively high and low refractive index layers deposited on said spacer layer;
   wherein a first thickness of said dielectric spacer layer and a second thickness of each of said high and low refractive index layers is selected such that incident radiation of wavelengths inside a predetermined resonant wavelength band is substantially transmitted through the dielectric stack and the spacer layer to the metal layer, and incident radiation of wavelengths outside the predetermined resonant wavelength band is substantially reflected from interfaces between said relatively high and low refractive index layers of said dielectric stack; and
   wherein the metal layer is opaque to incident radiation inside said predetermined resonant wavelength band, such that incident radiation transmitted through the dielectric spacer layer is channeled into and absorbed by the metal layer, and none of the incident radiation is transmitted through the metal layer.

2. An optical filter, as claimed in claim 1, wherein the dielectric spacer layer has the same composition and thickness as one of the constituent layers in the dielectric stack.

3. An optical filter as recited in claim 1, wherein the spacer layer is formed from a low refractive index material and is equal to even integer multiples of a quarter-wave optical thickness, including a zero (absentee layer), and symbolically described as;

Substrate/$MnL(HL)^xH$/ambient where:
   M is the metal layer;
   n=0,2,4,6, etc . . . ; even integer multiples of the quarter wave optical thickness of the spacer layer;
   H and L represent quarter wave optical thicknesses respectively of the high and low refractive index layers; and
   x is an integer indicating the number of pairs of L and H layers.

4. An optical filter as recited in claim 1, wherein the spacer layer is formed from a low refractive index material and is equal to odd integer multiples of quarter-wave (optical thickness), symbolically described as;

Substrate/$MnH(LH)^x$/ambient where:
   M is the metal layer;
   n=0,1,3,5,7,..., odd integer multiples of the quarter wave optical thickness of the spacer layer;
   H and L represent quarter wave optical thicknesses respectively of the high and low refractive index layers; and
   x is an integer indicating the number of pairs of L and H layers.

5. An optical filter as recited in claim 1 further comprising a tiered multi-layer stacking sequence of:

Substrate/$MH(LH)^4$/ambient where
   H and L equal one quarter-wave optical thicknesses, of relatively high and low refractive index materials, respectively, zinc sulphide and thorium fluoride.

6. An optical filter as recited in claim 1 further comprising:
   a tiered multi-layer stacking sequence of:

Substrate/$MHHH(LH)^4$/ambient where:
   H and L equal one quarter-wave optical thicknesses, of relatively high and low refractive index materials, respectively, zinc sulphide and thorium fluoride.

7. An optical filter, as claimed in claim 1 incorporating additional dielectric spacers, configured to steepen the absorption characteristic edge and so square off filter performance.

8. An optical filter as recited in claim 1 configured to operate in the wavelength band 8 to 12 µm.

9. An optical filter comprising:

a tiered multi-layer stacking sequence of:

$$\text{Substrate}/M(HL)^2xH(LH)^2\text{ambient};$$

wherein:

H and L equal one quarter-wave optical thickness of relatively high and low refractive index materials, respectively, zinc sulphide and thorium fluoride, with $xH(LH)^2$ forming a multilayer stack;

M is a metal layer;

'x' is between about 4 through 1000; and $(HL)^2$ defines a spacer layer deposited on said metal layer, a first thickness of said dielectric spacer layer and a second thickness of each layer of the multi-layer stack being selected such that incident radiation in a plurality of predetermined resonant wavelength bands is substantially transmitted through the multilayer stack and the spacer layer to the metal layer, and incident radiation outside said plurality of predetermined resonant wavelength bands is substantially reflected from said dielectric stack, the metal layer being opaque to the incident radiation in said plurality of predetermined resonant wavelength bands, such that the incident radiation transmitted through the dielectric spacer layer is channeled into and absorbed by the metal layer, and none of the incident radiation is transmitted through the metal layer.

10. A laser comprising:

a laser resonator terminated by first and second mirrors, at least one of said mirrors including a metal layer, a dielectric spacer layer deposited on said metal layer, a dielectric stack of alternating relatively high and low refractive index layers deposited on said spacer layer, the thickness of said dielectric spacer layer and the dielectric stack being selected such that incident radiation in a predetermined resonant wavelength band is substantially transmitted through the multilayer stack and the spacer layer to the metal layer, and incident radiation outside said predetermined resonant wavelength band is substantially reflected from said dielectric stack, the metal layer being opaque to the incident radiation in said predetermined resonant wavelength band, such that the incident radiation transmitted through the dielectric spacer layer is channeled into and absorbed by the metal layer, and none of the incident radiation is transmitted through the metal layer.

11. A laser comprising:

a laser resonator terminated by first and second mirrors, at least one of said mirrors including a tiered multi-layer stacking sequence of Substrate/$M(HL)^2xH(LH)^2$/ambient, where H and L equal one quarter-wave optical thickness of relatively high and low refractive index materials, zinc sulphide and thorium fluoride, respectively, with $xH(LH)^2$ forming a multilayer stack, M is an opaque reflective metal layer, 'x' is between about 4 through 1000, and $(HL)^2$ defines a spacer layer deposited on said metal layer, the thickness of said dielectric spacer layer and the multilayer stack being selected such that incident radiation in a plurality of predetermined resonant wavelength bands is substantially transmitted through the multilayer stack and the spacer layer to the metal layer, and incident radiation outside said plurality of predetermined resonant wavelength bands is substantially reflected from said dielectric stack, the metal layer being opaque to the incident radiation in said plurality of predetermined resonant wavelength bands, such that the incident radiation transmitted through the dielectric spacer layer is channeled into and absorbed by the metal layer, and none of the incident radiation is transmitted through the metal layer.

* * * * *